United States Patent
Lenz

(10) Patent No.: US 11,912,165 B2
(45) Date of Patent: Feb. 27, 2024

(54) CHARGING METHOD FOR AN ELECTRIC VEHICLE

(71) Applicant: AUDI AG, Ingolstadt (DE)

(72) Inventor: Michael Lenz, Dietfurt (DE)

(73) Assignee: AUDI AG, Ingolstadt (DE)

( * ) Notice: Subject to any disclaimer, the term of this patent is extended or adjusted under 35 U.S.C. 154(b) by 152 days.

(21) Appl. No.: 17/112,231

(22) Filed: Dec. 4, 2020

(65) Prior Publication Data
US 2021/0221255 A1    Jul. 22, 2021

(30) Foreign Application Priority Data

Jan. 16, 2020    (DE) .......................... 10 2020 100 955.0

(51) Int. Cl.
| | |
|---|---|
| H02J 7/00 | (2006.01) |
| B60L 58/27 | (2019.01) |
| B60L 53/60 | (2019.01) |
| F16H 57/04 | (2010.01) |
| B60L 50/60 | (2019.01) |
| B60K 17/356 | (2006.01) |
| B60K 1/00 | (2006.01) |

(52) U.S. Cl.
CPC ............ *B60L 58/27* (2019.02); *B60L 50/60* (2019.02); *B60L 53/60* (2019.02); *F16H 57/0413* (2013.01); *B60K 17/356* (2013.01); *B60K 2001/008* (2013.01); *B60L 2250/12* (2013.01); *B60L 2250/14* (2013.01); *Y02T 90/12* (2013.01)

(58) Field of Classification Search
CPC .......... B60L 58/27; B60L 50/60; B60L 53/60; B60L 2250/12; B60L 2250/14; F16H 57/0413; B60K 17/356; B60K 2001/008; Y02T 90/12

USPC ............................................ 320/109; 701/22
See application file for complete search history.

(56) References Cited

U.S. PATENT DOCUMENTS

| | | | |
|---|---|---|---|
| 2011/0155714 A1* | 6/2011 | Thomas ............. | B60H 1/00314 219/205 |
| 2011/0199047 A1 | 8/2011 | Fujii | |
| 2013/0166119 A1* | 6/2013 | Kummer .................. | B60L 1/02 701/22 |
| 2015/0345958 A1* | 12/2015 | Graham ................ | B60W 10/30 701/22 |

(Continued)

FOREIGN PATENT DOCUMENTS

| | | |
|---|---|---|
| CN | 109070752 A | 12/2018 |
| CN | 109866646 A | 6/2019 |

(Continued)

OTHER PUBLICATIONS

German Examination Report dated Oct. 15, 2020 in corresponding German Application No. 102020100955.0; 18 pages; Machine translation attached.

(Continued)

*Primary Examiner* — Zixuan Zhou
(74) *Attorney, Agent, or Firm* — Maier & Maier, PLLC

(57) ABSTRACT

A method for charging an electric vehicle. A traction battery of an electric vehicle connected to a stationary charging device is charged by the stationary charging device and a heating device of the electric vehicle is operated with electrical energy provided by the charging station, in particular predictively, as well as an electric vehicle.

7 Claims, 1 Drawing Sheet

(56) References Cited

U.S. PATENT DOCUMENTS

| | | | | |
|---|---|---|---|---|
| 2016/0009188 A1* | 1/2016 | Yokoyama | ............... | B60L 1/003 |
| | | | | 701/1 |
| 2016/0318370 A1* | 11/2016 | Rawlinson | ......... | B60H 1/32281 |
| 2018/0141458 A1* | 5/2018 | Jammoul | ................ | B60L 58/27 |
| 2020/0023750 A1* | 1/2020 | Fukami | ................ | B60W 20/13 |

FOREIGN PATENT DOCUMENTS

| | | |
|---|---|---|
| DE | 10310831 A1 | 11/2003 |
| DE | 102009059240 A1 | 6/2011 |
| DE | 102013017343 A1 | 4/2015 |
| DE | 102015012836 A1 | 4/2016 |
| DE | 102015013301 B3 | 2/2017 |
| EP | 2461991 A1 | 6/2012 |
| JP | 201151504 A | 3/2011 |
| KR | 1020190046287 A | 5/2019 |

OTHER PUBLICATIONS

Office Action dated Oct. 18, 2023, in corresponding Chinese Application No. 202011481164.2, 18 pages.

\* cited by examiner

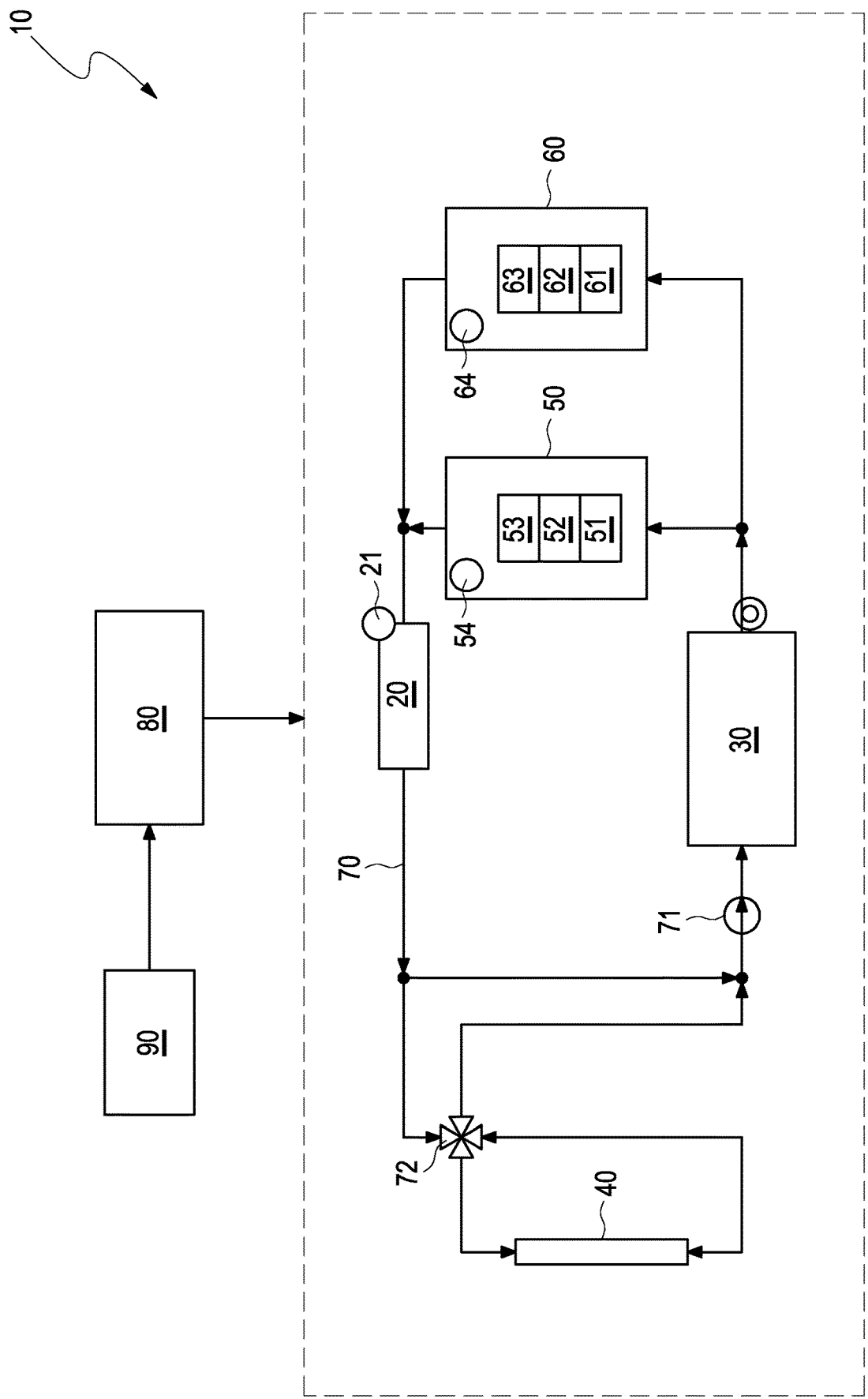

CHARGING METHOD FOR AN ELECTRIC VEHICLE

FIELD

The invention relates to a method for charging an electric vehicle, in which a traction battery of an electric vehicle connected to a stationary charging device is charged by the stationary charging device. The invention furthermore relates to an electric vehicle.

BACKGROUND

An electric vehicle within the meaning of the invention is a purely electric vehicle (electric vehicle, EV) or a plug-in hybrid vehicle (plug-in hybrid electric vehicle, PHEV) and comprises an electrically operated drive train. The drive train includes an electric motor, a gearbox driven by the electric motor, and an axle typically with two wheels driven by the gearbox. Furthermore, the electric vehicle comprises a traction battery, which is also referred to as a high-voltage (HV) battery, a charger for charging the traction battery by means of an external stationary charging device, and power electronics comprising an inverter, which power electronics are connected to the traction battery and the electric motor and which convert the electrical direct current power provided by the traction battery into direct-current power for the electric motor.

The electric vehicle also includes a thermal management system for heating and cooling components of the electric vehicle. The thermal management system includes a system of fluid lines, an electric pump, a plurality of temperature sensors, an electric heating device which can heat a fluid, such as water, which is circulating in the fluid lines and which is driven by the pump, an electric cooling device which can cool the fluid, and a control module which is electrically connected to the pump, the heating device, the cooling device, and the temperature sensors and is configured to control the pump, the heating device, and the cooling device as a function of signals from the temperature sensors.

While the electric vehicle is being driven, the drive train and the thermal management system and, to a relatively small extent, other electrical components of the electric vehicle consume electrical energy stored by the traction battery, as a result of which the traction battery is gradually discharged. A storage capacity of the traction battery and the electrical energy consumed by the thermal management and the other electrical components therefore define the electrical energy available for the drive train and therefore a range of the electric vehicle.

It is known to increase the range of the electric vehicle by charging the traction battery while the electric vehicle is being driven. For this purpose, the electric motor is operated as a generator when the electric vehicle requests braking. In the generator mode, which is also referred to as recuperation or recuperating, the driven wheels of the electric vehicle are braked by means of a torque provided by the electric motor, and kinetic energy of the electric vehicle is converted into electrical energy by the electric motor and the power electronics, with which energy the traction battery can be charged.

However, the electrical energy that can be recuperated during braking cannot always be completely stored in the traction battery. That said, recuperated electrical energy that cannot be stored can be used directly by the thermal management system, in particular the heating device of the thermal management system. Thanks to the recuperated electrical energy directly consumed by the thermal management system, the thermal management system uses less electrical energy stored in the traction battery, which further increases the range of the electric vehicle.

DE 10 2013 017 343 A1 discloses a method for charging an electric vehicle, in which a traction battery of the electric vehicle is charged with electric energy generated by an electric motor of the electric vehicle during braking of the electric vehicle when the traction battery provides a charging capacity, and a heating device of the traction battery is operated when the traction battery does not provide any charging capacity.

DE 10 2015 013 301 B3 discloses a method for charging an electric vehicle, in which a traction battery of the electric vehicle is charged with electric energy generated by an electric motor of the electric vehicle during braking of the electric vehicle, and an electric power of a heating device of the electric vehicle is increased, wherein an exceeding of a predetermined maximum electrical power of the heating device is avoided.

When the electric vehicle has traveled a distance corresponding to the range, the traction battery of the electric vehicle must be charged externally. For external charging of the traction battery, the charging device of the electric vehicle is connected to a stationary charging device, which provides electrical power from a stationary power supply for charging the traction battery.

While the recuperation of kinetic energy increases the range of the electric vehicle, unfavorable operating conditions of the traction battery and/or the electric drive train can reduce the range while the electric vehicle is being driven. Unfavorable operating conditions often exist after the traction battery has been charged externally.

SUMMARY

The invention is therefore based on the object of proposing an improved charging method for an electric vehicle which increases the range of the electric vehicle. Another object of the invention is to provide an electric vehicle with an increased range.

One subject matter of the invention is a method for charging an electric vehicle, in which a traction battery of an electric vehicle connected to a stationary charging device is charged by the stationary charging device. Such charging methods are widely used in electric vehicles such that the invention has a plurality of applications.

According to the invention, before the electric vehicle is disconnected from the stationary charging station, a heating device of the electric vehicle is operated with electrical energy provided by the charging station. Operation of the heating device does not consume any energy stored in the traction battery. In this manner, the range of the electric vehicle is not impaired by the operation of the heating device.

In a preferred embodiment, the traction battery and/or a component of a drive train of the electric vehicle is heated by the heating device. The ability of the traction battery to deliver electrical power depends on an operating temperature of the traction battery and increases as the operating temperature rises. The efficiency of the drive train depends on the operating temperatures of components of the drive train, in particular of the power electronics, of an electric motor, or of a gearbox, and increases as the operating temperature rises. The range of the electric vehicle can be increased by heating the traction battery and/or the components of the drive train.

Ideally, an electric motor, power electronics, a gearbox, and/or a gearbox oil of the electric vehicle is heated as the component of the drive train. The electric motor, the power electronics, the gearbox, and the gearbox oil have a particularly strong influence on the efficiency of the drive train.

In advantageous embodiments, the traction battery and/or the component of the drive train is heated to a predetermined temperature which is respectively optimal in terms of the efficiency of the electric vehicle. The less an operating temperature of the traction battery and/or the component of the drive train deviates from the respectively optimal temperature, the greater the efficiency thereof.

In further embodiments, a control module of the electric vehicle calculates a preheating time which ends at the departure time, starting from a predetermined departure time of the electric vehicle, and the heating device is operated during the calculated preheating time. In this manner, the traction battery and/or the component of the drive train can be predictively heated at the time of departure, i.e. they have respectively optimal temperatures at the start of travel of the electric vehicle. Corresponding heating of the traction battery and/or the component of the drive train while the electric vehicle is in motion is not required and does not reduce the range of the electric vehicle.

The predetermined departure time is preferably set by a user of the vehicle using a human-machine interface. The human-machine interface (HMI) can be designed as a component of the electric vehicle or separately from the electric vehicle, for example as a mobile terminal such as a smartphone. The user specifies the desired departure time using the human-machine interface. The charging process does not have to last up to the predetermined departure time but can be finished before the departure time. In this case, the preheating time can only begin after the end of the charging process, while the electric vehicle is still connected to the stationary charging device. The invention therefore also includes the case in which the electric vehicle is or remains connected to the stationary charging device only for preheating.

Alternatively, the predetermined departure time can also be set from a suitably programmed calendar, route planner, or a neural network, which learns the user's habits with regard to frequent trips.

Ideally, the heating device is operated before the electric vehicle is disconnected if the user of the vehicle selects a predetermined charging mode, and the heating device is not operated before the electric vehicle is disconnected if the user of the vehicle does not select the predetermined charging mode. In other words, operation of the heating device before the electric vehicle is disconnected is optional. By means of the human-machine interface, the user can decide by selecting or not selecting whether the traction battery and/or the component of the drive train should be heated in advance or not.

The subject matter of the invention is also an electric vehicle with a traction battery and a heating device which is configured to charge the traction battery from a stationary charging device when the electric vehicle is connected to the stationary charging device. Such electric vehicles are widely used. Accordingly, the invention has many applications.

According to the invention, the electric vehicle is further configured to operate the heating device with electrical energy provided by the charging station before the electric vehicle is disconnected from the stationary charging station. In this manner, the heating device does not load the traction battery of the electric vehicle, which is associated with an increased range of the electric vehicle.

In a preferred embodiment, the electric vehicle comprises a control module which provides a predetermined charging mode and is configured to calculate a preheating time ending at the departure time, starting from a predetermined departure time of the electric vehicle, and to control operation of the heating device during the calculated preheating time. The control module may comprise a charging device of the electric vehicle or a high-performance computing platform (HCP) of the electric vehicle or be formed as a separate control unit (electronic control unit, ECU) of the electric vehicle.

Ideally, the electric vehicle is configured to heat the traction battery and/or a component of a drive train of the electric vehicle to a predetermined temperature which is respectively optimal in terms of the efficiency of the electric vehicle and is detected by a temperature sensor. The control module can define respectively optimal temperatures for the traction battery and/or the component of the drive train and use them to calculate thermal models of the traction battery and/or the component.

The control module is advantageously configured to carry out a method according to the invention.

An essential advantage of the method according to the invention is that, at the start of travel, after external charging of the traction battery, operating conditions of the traction battery and/or of the drive train are immediately favorable, which is associated with an increased range of the electric vehicle. The achieved gain in range can mean that there is no need for interruption during long trips in order to externally charge the traction battery, which increases user satisfaction.

BRIEF DESCRIPTION OF THE DRAWINGS

The invention is schematically illustrated in the drawings with the aid of embodiments and is described further with reference to the drawings. The FIGURES show the following:

FIG. 1 a circuit diagram of a thermal management system 10 of an electric vehicle according to an embodiment of the present invention.

DETAILED DESCRIPTION

FIG. 1 shows a circuit diagram of a thermal management system 10 of an electric vehicle according to an embodiment of the present invention.

In addition to the thermal management system 10, the electric vehicle includes a traction battery 20 and a charger (not shown) and is configured to charge the traction battery 20 by means of the charger from a stationary charging device when the electric vehicle is connected to the stationary charging device.

Furthermore, the electric vehicle comprises a drive train 50 of the front axle with first power electronics 51, a first electric motor 52, and a first gearbox 53, and a drive train 60 of the rear axle with a second power electronics 61, a second electric motor 62, and a second gearbox 63.

The thermal management system 10 further comprises a heating device 30 and a system of fluid lines 70, a pump 71, and a four-way valve 72. The thermal management system 10 also includes a cooling device 40, which is designed as a low-temperature cooler 51. During operation of the thermal management system 10, a fluid, for example water, circulates in the system of fluid lines 70. The specific configuration of the thermal management system 10 shown here is merely exemplary and does not limit the invention in any way.

The traction battery 20, the components 51, 52, 53 of the drive train 50 of the front axle, and the components 61, 62, 63 of the drive train 60 of the rear axle are thermally connected to the thermal management system 10, i.e. operating temperatures of the traction battery 20 and of the components 51, 52, 53, 61, 62, 63 of the two drive trains, 50 and 60, can be set by the thermal management system 10.

The thermal management system 10 also includes a control module 80, which provides a predetermined charging mode for the electric vehicle. The control module 110 may comprise a high-performance computing platform (HCP) or the charger of the electric vehicle, or it can be embodied as a separate electronic control unit (ECU) of the electric vehicle. Of course, the control module 80 is operatively connected to the active components 21, 30, 40, 54, 64, 71, 72 of the thermal management system 10. For the sake of clarity, the operative connection with the active components 21, 30, 40, 54, 64, 71, 72 is only indicated in summary form.

The control module 80 is configured to calculate a preheating time ending at the departure time, starting from a predetermined departure time of the electric vehicle, and to control operation of the heating device 30 during the calculated preheating time. To this end, the control module 80 defines respectively optimal temperatures for the traction battery 20 and/or the components 51, 52, 53, 61, 62, 63 of the drive trains 50, 60. The preheating time is calculated based on the temperatures recorded by the temperature sensors 21, 54, 64, starting from the defined optimal temperatures, and thermal models of the traction battery 20 and/or of the components 51, 52, 53, 61, 62, 63 of the drive trains 50, 60.

The electric vehicle is thus configured to operate the heating device 30 with electrical energy provided by the charging station and to preheat the traction battery 20 and/or a component 51, 52, 53, 61, 62, 63 of the drive trains 50, 60 of the electric vehicle to the predetermined temperatures respectively optimal in terms of efficiency of the electric vehicle and recorded by the temperature sensors 21, 54, 64, before the electric vehicle is disconnected from the stationary charging station.

The thermal management system 10 further comprises a human-machine interface (HMI) 90, which can be designed as a component of the electric vehicle or separately from the electric vehicle, for example as a mobile terminal such as a smartphone, and which is configured to enable a user to set the predetermined departure time and/or to select the predetermined charging mode.

For charging, the electric vehicle is connected to a stationary charging device. The user sets the predetermined departure time by means of the human-machine interface 90 and selects the predetermined charging mode. On the basis of the set, predetermined departure time, the control module 80 calculates a preheating time ending at the departure time. The traction battery 20 of the electric vehicle is then charged by the stationary charging device.

If the user has selected the predetermined charging mode, the heating device 30 is operated during the calculated preheating time and before the electric vehicle is disconnected. On the other hand, if the user does not select the predetermined charging mode, the heating device 30 is not operated before the electric vehicle is disconnected.

The heating device 30 is operated with electrical energy provided by the charging station. The traction battery 20 and/or one or more components 51, 52, 53, 61, 62, 63 of the drive trains 50, 60 are heated by the heating device 30. In particular, the electric motors 52, 62 and/or the gearboxes 53, 63 are heated as components 51, 52, 53, 61, 62, 63 of the drive trains 50, 60. In this case, the traction battery 20 and/or the components 51, 52, 53, 61, 62, 63 of the drive trains 50, 60 are heated to predetermined temperatures which are respectively optimal in terms of the efficiency of the electric vehicle.

Thus, the operating temperatures of the traction battery 20 and of the components 51, 52, 53, 61, 62, 63 of the drive trains 50, 60 are favorable at the predetermined departure time. The time spent driving at unfavorable operating temperatures immediately after the start of travel is therefore avoided or at least shortened without loading the traction battery 20, as a result of which the range of the electric vehicle is increased.

LIST OF REFERENCE NUMERALS

10 Thermal management system
20 Traction battery
21 Temperature sensor
30 Heating device
40 Cooling device
50 Front axle drive train
51 Power electronics, component
52 Electric motor, component
53 gearbox, component
54 Temperature sensor
60 Rear axle drive train
61 Power electronics, component
62 Electric motor, component
63 Gearbox, component
64 Temperature sensor
70 System of fluid lines
71 Pump
72 Four-way valve
80 Control module
90 Human-machine interface

The invention claimed is:

1. A method for charging an electric vehicle comprising:
charging a traction battery of the electric vehicle connected to a stationary charging device by the stationary charging device; and, before the electric vehicle is disconnected from the stationary charging device,
operating a heating device of the electric vehicle with electrical energy provided by the stationary charging device;
heating the traction battery and a component of a drive train of the electric vehicle by the heating device to a predetermined temperature which is optimal in terms of an efficiency factor of the electric vehicle, wherein a first temperature sensor is configured to sense a temperature of the traction battery and a second temperature sensor is configured to sense a temperature of the component of the drive train;
calculating, with a control module of the electric vehicle, a preheating time ending at a predetermined departure time set from a programmed calendar, wherein the preheating time is calculated based upon temperatures recorded by both the first temperature sensor and the second temperature sensor; and
operating the heating device during the calculated preheating time immediately before the predetermined departure time, wherein the charging is finished before the predetermined departure time.

2. The method according to claim 1, further comprising:
heating an electric motor, power electronics, a gearbox, and/or gearbox oil of the electric vehicle as the component of the drive train.

3. The method according to claim 1, further comprising:
setting the predetermined departure time by the user of the electric vehicle by a human-machine interface.

4. The method according to claim 1, further comprising:
operating the heating device before the electric vehicle is disconnected after the user of the electric vehicle selects a predetermined charging mode; and
not operating the heating device before the electric vehicle is disconnected after the user of the electric vehicle does not select the predetermined charging mode.

5. The method according to claim 2, further comprising:
setting the predetermined departure time by the user of the electric vehicle by a human-machine interface.

6. The method according to claim 2, further comprising:
operating the heating device before the electric vehicle is disconnected after the user of the electric vehicle selects a predetermined charging mode; and
not operating the heating device before the electric vehicle is disconnected after the user of the electric vehicle does not select the predetermined charging mode.

7. An electric vehicle comprising:
a traction battery;
a heating device configured to:
  charge the traction battery from a stationary charging device when the electric vehicle is connected to the stationary charging device and
  operate with electrical energy provided by the stationary charging device before the electric vehicle is disconnected from the stationary charging device, wherein the traction battery and a component of a drive train of the electric vehicle is heated by the heating device to a predetermined temperature;
a first temperature sensor is configured to sense a temperature of the traction battery;
a second temperature sensor is configured to sense a temperature of the component of the drive train, wherein the predetermined temperature is optimal in terms of an efficiency factor of the electric vehicle; and
a control module configured to:
  provide a predetermined charging mode,
  calculate a preheating time ending at a predetermined departure time set from a programmed calendar, wherein the preheating time is calculated based upon temperatures recorded by both the first temperature sensor and the second temperature sensor, and
  control operation of the heating device during the calculated preheating time immediately before the predetermined departure time, wherein the charging is finished before the predetermined departure time.

* * * * *